United States Patent
Hopp et al.

(10) Patent No.: US 10,343,848 B2
(45) Date of Patent: Jul. 9, 2019

(54) DEVICE FOR MONITORING A BELT TEAR IN A CONVEYOR BELT

(71) Applicant: IFM ELECTRONIC GMBH, Essen (DE)

(72) Inventors: Hansjörg Hopp, Witten (DE); Conrad Marius Du Plessis, Springs (ZA)

(73) Assignee: IFM Electronic GmbH, Essen (DE)

(*) Notice: Subject to any disclaimer, the term of this patent is extended or adjusted under 35 U.S.C. 154(b) by 0 days.

(21) Appl. No.: 15/520,610

(22) PCT Filed: May 9, 2016

(86) PCT No.: PCT/EP2016/060261
§ 371 (c)(1),
(2) Date: Apr. 20, 2017

(87) PCT Pub. No.: WO2016/184707
PCT Pub. Date: Nov. 24, 2016

(65) Prior Publication Data
US 2018/0057270 A1 Mar. 1, 2018

(30) Foreign Application Priority Data
May 21, 2015 (DE) .................. 10 2015 209 357

(51) Int. Cl.
*B65G 43/02* (2006.01)
*G08B 3/10* (2006.01)
(Continued)

(52) U.S. Cl.
CPC ...... *B65G 43/02* (2013.01); *B65G 2203/0275* (2013.01); *B65G 2203/047* (2013.01);
(Continued)

(58) Field of Classification Search
CPC ........ B65G 43/02; B65G 23/00; B65G 39/16; B65G 15/28; B65G 2203/0275; B65G 2203/047
(Continued)

(56) References Cited

U.S. PATENT DOCUMENTS 3,651,506 A * 3/1972 Olaf ................... B65G 43/02
198/810.02
3,656,137 A * 4/1972 Ratz ................... B65G 43/02
198/810.02
(Continued)

FOREIGN PATENT DOCUMENTS

CN 202098823 1/2012
DE 91443 7/1972
(Continued)

OTHER PUBLICATIONS

International Search Report, International Application No. PCT/EP2016/060261, pp. 1-2, International Filing Date May 9, 2016, dated Jul. 19, 2016.

*Primary Examiner* — Hoi C Lau
(74) *Attorney, Agent, or Firm* — Bond Schoeneck & King, PLLC; George McGuire

(57) ABSTRACT

The invention relates to an arrangement for detecting a belt tear in a conveyor belt, comprising a trigger (1) which is arranged below the conveyor belt (2) transversely to the conveying direction of the conveyor belt and which is connected to a load limit switch (3). The arrangement also comprises a signalling device (4) for indicating and/or signalling a belt tear to a control unit (5). The invention is characterized in that a chain (6) which is suspended below the conveyor belt (2) is used as the trigger (1), said chain transmitting forces produced in the event of a belt tear to the load limit switch (3). In an advantageous embodiment, the load limit switch (3) has an inductive proximity switch (7),
(Continued)

and in an additional advantageous embodiment, the load limit switch is connected to a control unit (5) via an actuator sensor interface (8) as a bus participant.

5 Claims, 2 Drawing Sheets

(51) Int. Cl.
  *G08B 21/18* (2006.01)
  *H04L 29/08* (2006.01)
(52) U.S. Cl.
  CPC .............. *G08B 3/10* (2013.01); *G08B 21/182* (2013.01); *H04L 67/12* (2013.01)
(58) Field of Classification Search
  USPC ................. 340/668, 676; 73/865.8, 862.453; 198/810.02, 502.2
  See application file for complete search history.

(56) References Cited

U.S. PATENT DOCUMENTS

| | | | | |
|---|---|---|---|---|
| 3,792,459 A * | 2/1974 | Snyder | ................... | B65G 43/02 198/810.02 |
| 4,087,800 A * | 5/1978 | Lee | ......................... | B65G 43/02 198/810.02 |
| 4,462,523 A * | 7/1984 | Kerr | ....................... | B65G 43/02 198/810.02 |
| 5,647,640 A * | 7/1997 | Heintzmann | ........... | E21C 27/34 299/1.6 |
| 6,131,727 A * | 10/2000 | Nelson | ................... | B65G 43/02 198/810.02 |
| 6,712,199 B1 * | 3/2004 | Buckner | ................. | B65G 15/08 198/810.03 |
| 2002/0145529 A1 * | 10/2002 | Kuzik | ..................... | B65G 43/02 340/676 |
| 2003/0168317 A1 * | 9/2003 | Fromme | ................. | B65G 43/02 198/502.1 |
| 2004/0149049 A1 * | 8/2004 | Kuzik | ..................... | B65G 43/02 73/862.453 |
| 2007/0145308 A1 * | 6/2007 | Kemp | ..................... | B65G 43/02 250/559.08 |
| 2008/0122640 A1 * | 5/2008 | Burwell | ............... | B23K 31/125 340/608 |
| 2009/0000024 A1 * | 1/2009 | Louis | ..................... | E03C 1/046 4/676 |
| 2010/0122893 A1 * | 5/2010 | Wallace | ................. | B65G 45/02 198/810.02 |
| 2010/0294624 A1 * | 11/2010 | Warner | .................. | B65G 43/02 198/502.2 |
| 2012/0012443 A1 * | 1/2012 | Sakaguchi | ............. | B65G 43/02 198/824 |
| 2014/0108182 A1 * | 4/2014 | Hoban | ................... | G06Q 10/06 705/26.4 |
| 2015/0170109 A1 * | 6/2015 | Sakuragi | ................ | B65G 43/02 705/7.25 |
| 2016/0068350 A1 * | 3/2016 | Wallace | ................. | B65G 43/02 198/810.02 |
| 2016/0103084 A1 * | 4/2016 | Kleczewski | ........... | B65G 17/08 324/652 |
| 2016/0152416 A1 * | 6/2016 | Staab | ..................... | B65G 43/02 73/865.8 |
| 2016/0327517 A1 * | 11/2016 | Sakaguchi | ............. | B65G 43/02 |
| 2017/0305682 A1 * | 10/2017 | Wallace | ................. | B65G 15/36 |
| 2017/0305683 A1 * | 10/2017 | Sakuragi | ................ | B65G 43/02 |
| 2017/0334651 A1 * | 11/2017 | Miller | ................... | B65G 15/58 |
| 2018/0057270 A1 * | 3/2018 | Hopp | ..................... | B65G 43/02 |

FOREIGN PATENT DOCUMENTS

| | | |
|---|---|---|
| DE | 8900370 | 3/1989 |
| DE | 1228561 | 11/1996 |
| DE | 10221878 | 10/2008 |

* cited by examiner

Prior art

DEVICE FOR MONITORING A BELT TEAR IN A CONVEYOR BELT

CROSS-REFERENCE TO RELATED APPLICATION

This application is the U.S. National Stage filing under 35 U.S.C. 371 of international application number PCT/EP2016/060261, filed on May 9, 2016, which claims priority to German Application No. 10 2015 209 357.3, filed May 21, 2015, the entire disclosure of each of which is incorporated herein by reference.

BACKGROUND OF THE INVENTION

The invention relates to a device for monitoring a belt tear in a conveyor belt according to the preamble of claim 1. The device is suitable for monitoring long haulways such as are used in the mining industry, particularly in opencast mining.

In these haulways of several hundred meters or even in the kilometer range an efficient and cost-efficient monitoring for longitudinal tears is of great importance.

A known monitoring means comprises steel cables disposed transversely to the conveying direction below the conveyor belt, which are connected to a respective mechanical load limit switch.

The friction losses associated with the tightly fitted steel cables and the delayed detection of tears beginning to form associated with a greater distance between steel cable and conveyor belt are regarded as disadvantageous.

Another problem was the lack of weather resistance of the mechanical load limit switches used.

DE 10221878 A1 discloses a device which is principally suitable as a substitute for the mechanical load limit switch. It is, however, configured complex and its production in relatively small quantities is relative expensive.

SUMMARY OF THE INVENTION

It is an object of the invention to enable a rapid detection of longitudinal and transversal tears which begin to form in the conveyor belt and to minimize the friction losses at the conveyor belt. Moreover, it is intended to improve the reliability and in particular the weather resistance of the assembly.

This object is achieved according to the characterizing part of claim 1. The dependent claims relate to the advantageous embodiment of the invention.

The essential idea of the invention is to replace the steel cable by a chain. In an advantageous embodiment the mechanical load limit switch is replaced by a per se known inductive load limit switch which according to the invention includes an inductive, safe or unsafe proximity switch which as a mass product can be manufactured at very low cost and is readily available.

The chain combines the advantages of a thin steel cable with the stability of a stronger steel cable.

Due to its weight the chain always sags sufficiently such that an almost constant gap between the bottom side of the conveyor belt and the chain acting as a trigger is obtained. Furthermore, the chain has a high tensile strength.

In the case of a mechanical contact of the trigger with the bottom side of the conveyor belt the friction losses with the chain links are significantly lower than with a steel cable.

BRIEF DESCRIPTION OF THE DRAWINGS

Hereinafter the invention will be explained in more detail with reference to the drawing.

DETAILED DESCRIPTION OF EMBODIMENTS

Figure 1:
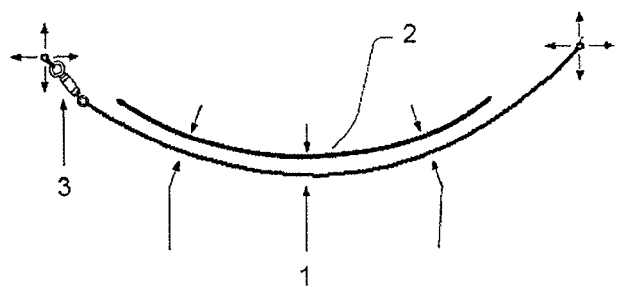
FIG. 1 shows the prior art comprising a steel cable as a trigger and a mechanical load limit switch.

FIG. 1 shows the prior art comprising a steel cable as a trigger 1 disposed transverse to the conveying direction below the conveyor belt 2 and comprising a mechanical load limit switch 3.

Figure 2:
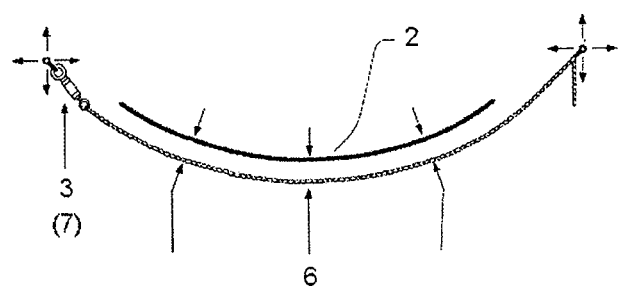
FIG. 2 shows the assembly according to the invention comprising a chain as a trigger and an optional inductive load limit switch.

FIG. 2 shows the monitoring device according to the invention comprising a chain 6 as a trigger 1, wherein the load limit switch 3 according to an advantageous embodiment of the invention may comprise an inductive proximity switch 7.

Figure 3:
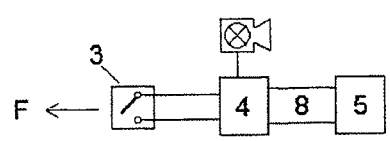
FIG. 3 shows an assembly for signal evaluation and signalling a belt tear.

FIG. 3 shows an assembly for signal evaluation and signalling a belt tear, wherein the load limit switch 3 is opened by a force F transmitted by the trigger 1 (not show herein).

A signalling device 4, for example, a programmable logic controller (PLC) comprising a microcontroller triggers an alarm signal by means of the illustrated siren and signals the process to a superordinate control unit 5. This can be done via a fieldbus 8 which is implemented herein as an actuator-sensor interface (AS-i), wherein both components are AS-i bus participants.

Figure 4:
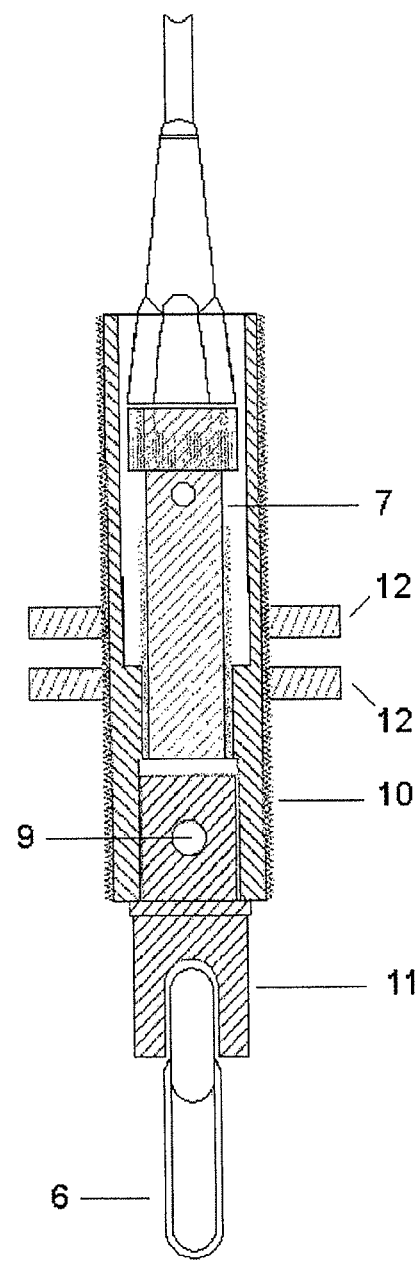
FIG. 4 shows the load limit switch according to the invention including an inductive proximity switch.

FIG. 4 shows a cross-sectional view of the load limit switch 3 including an inductive proximity switch 7. The chain 6 acting according to the invention as a trigger 1 is attached to a counterpart 11, which is held in a sleeve 10 by means of a spring ball 9. The front side of the counterpart 11 made of metal abuts at the sensor surface of an inductive proximity switch 7 screwed into the sleeve 10. The sleeve 10 comprises an external thread and can be fixed by fastening nuts 12.

If a tear occurs in the conveyor belt 2 the force F applied to the chain 6 illustrated in the previous FIG. 3 increases, so that the spring ball 9 relaxes and the counterpart 11 is pulled out of the sleeve 10. Thus, the counterpart 11 leaves the monitoring range of the proximity switch 7, wherein the proximity switch detects this fact and forwards this fact to the signalling device 4 shown in FIG. 3 via its connection cable and thus triggers the processes described above. The spring ball 9 is a known assembly in which a steel ball biased by a spring tongue or a spiral spring is pressed into an opening or a recess of the sleeve 10.

LIST OF REFERENCE SYMBOLS

1 Trigger
2 Conveyor belt
3 Load limit switch
4 Signalling device (bus participant)
5 Superordinate controller
6 Chain (trigger)
7 Inductive proximity switch
8 Actuator-sensor interface (field bus system)
9 Spring ball
10 Sleeve
11 Counterpart
12 Fastening nut

What is claimed is:

1. Assembly for detecting a belt tear in a conveyor belt comprising a trigger which is disposed transversely to the conveying direction below the conveyor belt and is connected to a load limit switch, and a signalling device for indicating and/or signalling a belt tear to a superordinate control unit; wherein the trigger is built by a chain having a weight that produces a constant sag such that a gap exists between the bottom side of the conveyor belt and the chain and transmits forces onto the chain, which forces are generated in the case of a belt tear to the load limit switch.

2. Assembly according to claim 1, wherein said load limit switch comprises an inductive proximity switch which is connected to said chain which sags below said conveyor belt.

3. Assembly according to claim 1, wherein the signalling device comprises an actuator-sensor interface.

4. Assembly according to claim 2, wherein the load limit switch comprises a spring ball.

5. Bus participant in an actuator-sensor interface for detecting a belt tear in a conveyor belt, comprising a load limit switch having an inductive proximity switch connected to a trigger built by a chain having a weight that produces a constant sag such that a gap exists between the bottom side of the conveyor belt and the chain and transmits forces onto the chain, which forces are generated in the case of a belt tear to the load limit switch.

* * * * *